US011840904B2

(12) United States Patent
Cavazos Sepulveda et al.

(10) Patent No.: US 11,840,904 B2
(45) Date of Patent: Dec. 12, 2023

(54) METHODS AND APPARATUS FOR PRINTING A WELLBORE CASING (71) Applicant: SAUDI ARABIAN OIL COMPANY, Dhahran (SA)

(72) Inventors: Adrian Cesar Cavazos Sepulveda, Garza Garcia (MX); Abdulwahab S. Al-Johar, Dhahran (SA); Amjad Shaarawi, Khobar (SA); Timothy Eric Moellendick, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 27 days.

(21) Appl. No.: 17/652,798

(22) Filed: Feb. 28, 2022

(65) Prior Publication Data
US 2023/0272690 A1    Aug. 31, 2023

(51) Int. Cl.
*E21B 33/138* (2006.01)
*E21B 10/26* (2006.01)
*E21B 47/08* (2012.01)

(52) U.S. Cl.
CPC .......... *E21B 33/138* (2013.01); *E21B 47/08* (2013.01); *E21B 10/265* (2020.05)

(58) Field of Classification Search
None
See application file for complete search history.

(56) References Cited

U.S. PATENT DOCUMENTS

| 11,708,632 B2 * | 7/2023 | Heng ................. C23C 6/00 118/667 |
| 2015/0083422 A1 | 3/2015 | Pritchard |
| 2016/0258256 A1 | 9/2016 | Nguyen et al. |
| 2017/0175906 A1 | 6/2017 | Martino et al. |
| 2018/0079696 A1 | 3/2018 | Skyler |
| 2018/0245437 A1 | 8/2018 | Yang et al. |

(Continued)

FOREIGN PATENT DOCUMENTS

WO    2019010743 A1    1/2019

OTHER PUBLICATIONS

Breddermann, K., et al., "Printed pressure housings for underwater applications", Ocean Engineering, ScienceDirect, Elsevier Ltd., vol. 113, Jan. 2016, pp. 57-63 (7 pages).

(Continued)

*Primary Examiner* — Charles R Nold
(74) *Attorney, Agent, or Firm* — Osha Bergman Watanabe & Burton LLP (57) ABSTRACT

A method includes introducing a drill string including a bottom hole assembly into a wellbore, wherein the bottom hole assembly includes a mounted 3D printing sub-assembly. A wellbore is drilled with the bottom hole assembly, and at least a portion of a casing is printed with the 3D printing sub-assembly while drilling the wellbore. A related system includes a drill string having a length of drill pipe and a bottom hole assembly disposed at a distal end of the length of drill pipe. A 3D printing sub-assembly is mounted on the bottom hole assembly, wherein the printing sub-assembly includes a printer housing and a 3D printing head mounted at the printer housing. A control guides the 3D printing head to print at least a portion of a casing at a location radially away from the central longitudinal axis of the drill string.

13 Claims, 12 Drawing Sheets

(56) References Cited

U.S. PATENT DOCUMENTS

| | | | |
|---|---|---|---|
| 2018/0274357 A1 | 9/2018 | Jaaskelainen et al. | |
| 2019/0041173 A1 | 2/2019 | Yang et al. | |
| 2019/0169956 A1* | 6/2019 | Boul | B29C 64/25 |
| 2020/0199979 A1 | 6/2020 | Fripp et al. | |
| 2021/0223006 A1 | 7/2021 | Metzger et al. | |
| 2021/0331387 A1* | 10/2021 | Duffy | C22C 1/051 |
| 2022/0228442 A1* | 7/2022 | Voglewede | E21B 10/42 |

OTHER PUBLICATIONS

Jiang, Chao and Gao-Feng Zhao, "A Preliminary Study of 3D Printing on Rock Mechanics", Rock Mech Rock Eng, Springer-Verlag, Jun. 2014 (10 pages).

Mazhoud, Brahim, et al., "Underwater 3D printing of cement-based mortar", Construction and Building Materials, ScienceDirect, Elsevier Ltd., vol. 214, Apr. 2019, pp. 458-467 (10 pages).

Wang, Jianfeng, et al., "Characterization of the underwater welding arc bubble through a visual sensing method", Journal of Materials Processing Tech., ScienceDirect, Elsevier B.V., vol. 251, 2018, pp. 95-108 (14 pages).

* cited by examiner

FIG. 12

METHODS AND APPARATUS FOR PRINTING A WELLBORE CASING

BACKGROUND

Hydrocarbon fluids are located below the surface of the Earth in subterranean porous rock hydrocarbon-bearing formations called "reservoirs". In order to extract the hydrocarbon fluids, wells may be drilled to gain access to the reservoirs.

A step in the drilling operations may include well construction activities, such as casing the wellbore. During casing construction, in some instances casing is cemented in place along a portion of the length of the wellbore. In such an instance, upon completion of drilling a section of well bore, the drill string may be pulled out of the wellbore and a section of casing is deployed and cemented into place to create fluid and mechanical isolation from the newly drilled formation.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed relate to a method including introducing a drill string that includes a bottom hole assembly into a wellbore, wherein the bottom hole assembly includes a mounted 3D printing sub-assembly. A wellbore is drilled with the bottom hole assembly, and at least a portion of a casing is printed with the 3D printing sub-assembly while drilling the wellbore.

In another aspect, embodiments disclosed relate to a system for 3D printing at least a portion of a casing in a wellbore. The system includes a drill string that includes a length of drill pipe and a bottom hole assembly disposed at a distal end of the length of drill pipe, the drill string defining a central longitudinal axis. A 3D printing sub-assembly is mounted on the bottom hole assembly, wherein the printing sub-assembly includes a printer housing and a 3D printing head mounted at the printer housing. A control guides the 3D printing head to print at least a portion of a casing at a location radially away from the central longitudinal axis of the drill string.

In yet another aspect, embodiments disclosed relate to a 3D printing sub-assembly for printing at least a portion of a casing in a wellbore. The sub-assembly includes a printer housing and a 3D printing head mounted at the printer housing. A control guides the 3D printing head to print at least a portion of a casing at a location radially away from a central longitudinal axis of a drill string in the wellbore.

Other aspects and advantages of the claimed subject matter will be apparent from the following Detailed Description and the appended Claims.

DETAILED DESCRIPTION

In the following Detailed Description, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the Detailed Description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In accordance with one or more embodiments, methods and arrangements for creating a casing, such as via a 3D (three dimensional) printing process, in-situ and at the same time that a wellbore section is being drilled, during a workover operation, or during other downhole operations, are provided.

More particularly, in oil and gas drilling operations, a reduction in total drilling time remains a key objective. Thus one or more embodiments as broadly contemplated relate to processes and arrangements for effecting well completion simultaneously while drilling, particularly by way of 3D printing a wellbore casing during a drilling operation. Further, this general concept can also extend to remedial operations, such as the repair of a damaged casing (or other pipe) or the remedial wholesale construction of short sections thereof.

To facilitate easier reference when describing FIGS. 1 through 12, reference numerals may be advanced by a multiple of 100 in indicating a similar or analogous component or element among FIGS. 1-12, that is like numbers may be like elements.

Figure 1:
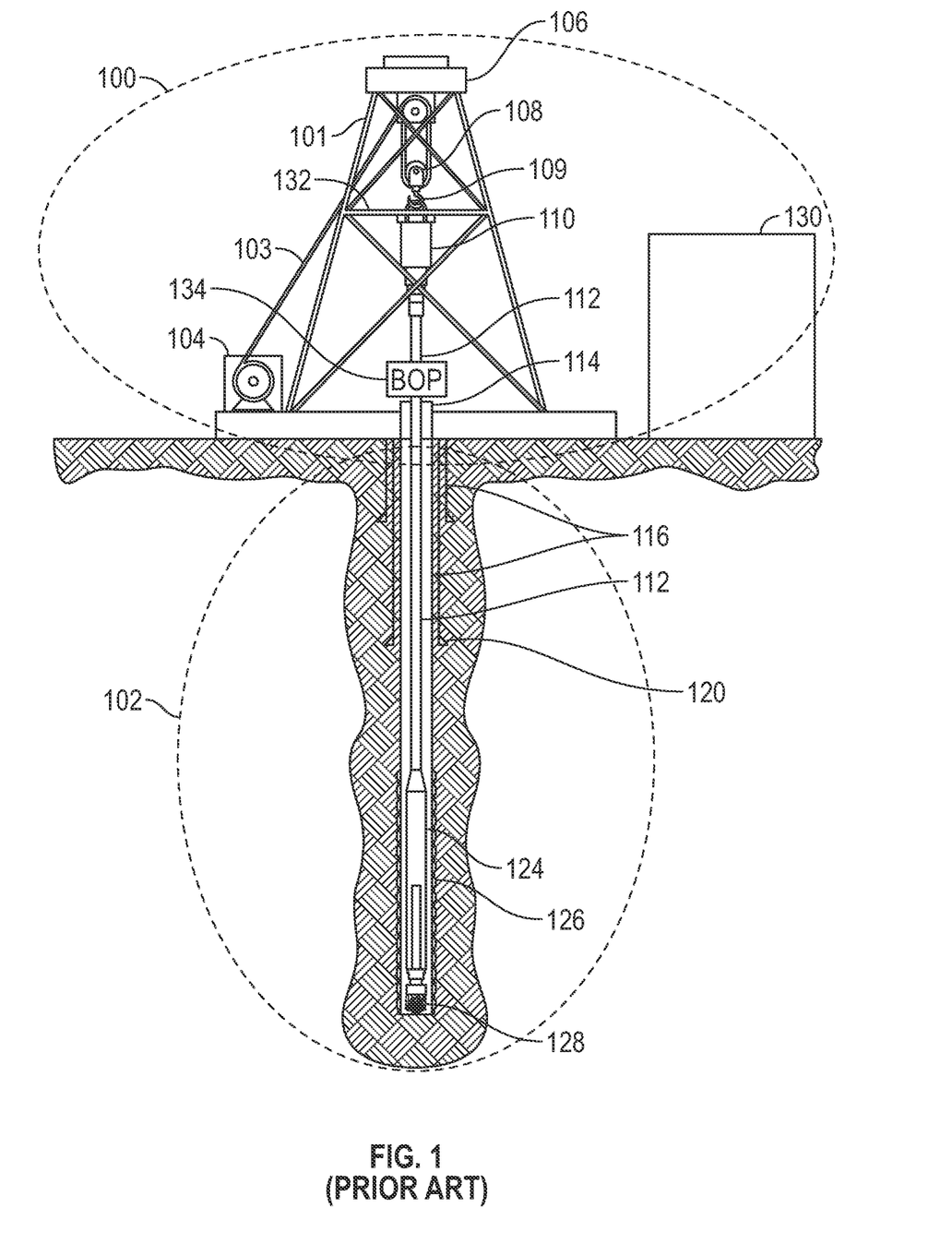
FIG. 1 schematically illustrates, in a cross-sectional and elevational view, a conventional drilling rig and wellbore by way of general background.

FIG. 1 schematically illustrates, in a cross-sectional elevational view, a conventional drilling rig and wellbore by way of general background. As such, FIG. 1 illustrates a non-restrictive example of a well site 100. The well site 100 is depicted as being on land. In other examples, the well site 100 may be offshore, and drilling may be carried out with or without use of a marine riser. A drilling operation at well site 100 may include drilling a wellbore 102 into a subsurface, including various formations 126. For the purpose of drilling a new section of wellbore 102, a drill string 112 (alternatively, a "length of drill pipe") is suspended within the wellbore 102. The drill string 112 may include one or more drill pipes connected to form a conduit and a bottom hole assembly (BHA) 124 disposed at the distal end of the conduit (or of the length of drill pipe). The BHA 124 may include a drill bit 128 to cut into the subsurface rock. The BHA 124 may include measurement tools, such as a measurement-while-drilling (MWD) tool or a logging-while-drilling (LWD) tool (not shown), as well as other drilling tools that are not specifically shown but would be understood to a person skilled in the art.

Additionally, by way of general background, the drill string 112 may be suspended in wellbore 102 by a derrick structure 101. As shown, derrick structure 101 is disposed at a terrestrial surface 114 and includes a rig floor 132 positioned a distance above the surface 114. A blowout preventer ("BOP") 134 may also be positioned at the surface 114, at an upper end of wellbore 102 and below the rig floor 132. A crown block 106 may be mounted at the top of the derrick structure 101. A traveling block 108 may hang down from the crown block 106 by means of a cable or drill line 103. One end of the drill line 103 may be connected to a drawworks 104, which is a reeling device that can be used to adjust the length of the drill line 103 so that the traveling block 108 may move up or down the derrick structure 101. The traveling block 108 may include a hook 109 on which a top drive 110 is supported. The top drive 110 is coupled to the top of the drill string 112 and is operable to rotate the drill string 112. Alternatively, the drill string 112 may be rotated by means of a rotary table (not shown), which may be disposed on rig floor 132. Drilling fluid (commonly called mud) may be pumped from a mud system 130 into the drill string 112. The mud may flow into the drill string 112 through appropriate flow paths in the top drive 110 or through a rotary swivel if a rotary table is used.

Further, by way of general background and during a drilling operation at the well site 100, the drill string 112 is typically rotated relative to the wellbore 102. Weight is applied to the drill bit 128 to enable the drill bit 128 to break rock as the drill string 112 is rotated. In some cases, the drill bit 128 may be rotated independently of the drill string 112 with a drilling motor (not shown). In other embodiments, the drill bit 128 may be rotated using a combination of a drilling motor (not shown) and the top drive 110 (or a rotary swivel if a rotary table 114 is used instead of a top drive) to rotate the drill string 112. While cutting rock with the drill bit 128, mud (not shown) is pumped into the drill string 112. The mud flows down the drill string 112 and exits into the bottom of the wellbore 102 through nozzles in the drill bit 128. The mud in the wellbore 102 then flows back up to the surface 114 in an annular space between the drill string 112 and the wellbore 102 carrying entrained cuttings to the surface 114. The mud with the cuttings is returned to the mud system 130 to be circulated back again into the drill string 112. Typically, the cuttings are removed from the mud and the mud is reconditioned as necessary before pumping the mud again into the drill string 112.

Moreover, by way of general background, drilling operations are typically completed upon the retrieval of the drill string 112, the BHA 124, and the drill bit 128 from the wellbore 102. In some embodiments of wellbore 102 construction, production casing operations may commence. A casing string 116, which is made up of one or more tubulars that have a larger inner diameter than the drill string 112 but a smaller outer diameter than the wellbore 102, is lowered into the wellbore 102 on the drill string 112. Generally, the casing string 116 is designed to isolate the internal diameter of the wellbore 102 from the adjacent formation 126. Once the casing string 116 is in position, it is set and cement is typically pumped down through the internal space of the casing string 116, out of the bottom of the casing shoe 120, and into the annular space between the wellbore 102 and the outer diameter of the casing string 116. This secures the casing string 116 in place and creates the desired isolation between the wellbore 102 and the formation 126. At this point, drilling of the next section of the wellbore 102 may commence.

Figure 2:
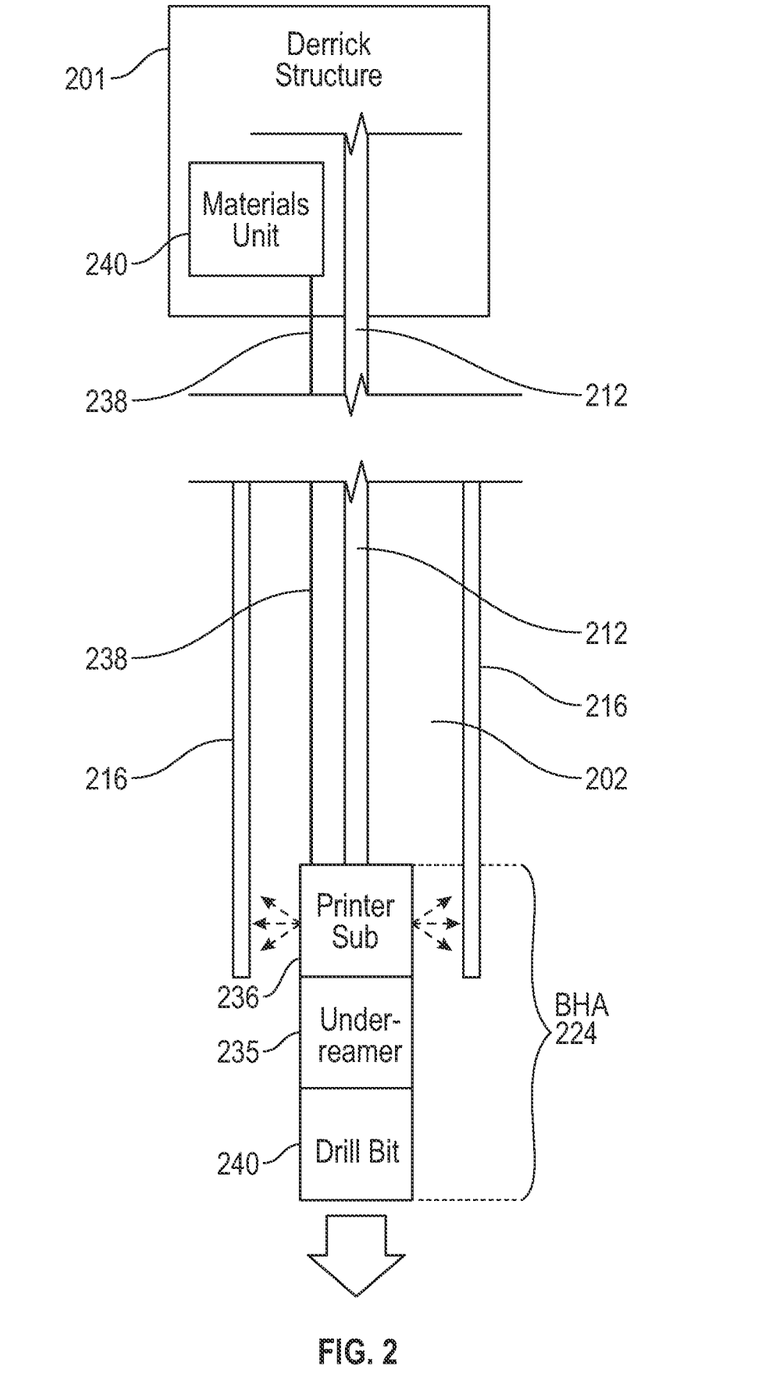
FIG. 2 schematically illustrates general components for 3D for printing a casing, in accordance with one or more embodiments.

FIG. 2 schematically illustrates general components for 3D printing a casing, in accordance with one or more embodiments. Drill string 212 extends downhole from derrick structure 201 and includes at its distal end a BHA 224 with a drill bit 228 and under-reamer 235. The drill bit 228 may be mounted and driven in a manner similar to the drill bit indicated at 128 in FIG. 1. BHA 224 includes a printing sub-assembly (or "printer sub") 236. One or more feedlines 238 extends downhole from a materials unit 240, which is disposed on the derrick structure 201 (for instance, on a rig floor such as that indicated at 132 in FIG. 1) and couples to printer sub 236. Materials unit 240 may include a store of welding fluids (which may be gas, liquid, solid, or a combination of these) and 3D printing material for use with a 3D printing head located at the printer sub 236. The 3D printing material may be provided in filament form to combine with the welding fluids in a heater unit at the printer sub 236. Possible 3D printing material can include but need not be limited to stainless steel, other metals (such as alloys of titanium, magnesium and aluminum), and engineering plastics and fibers (such as glass fiber composites, carbon fiber composites, epoxies and basalt fibers).

Generally, in accordance with one or more embodiments, casing 216 may be printed in a downhole direction via the printer sub 236 over a given length with respect to wellbore 202, and concomitantly with drilling of the wellbore 202 via drill bit 228 and under-reamer 235.

The disclosure now turns to detailed working examples, described and illustrated with respect to FIGS. 3-7, for printing a casing in a downhole direction from a casing hanger or directly onto exposed rock of a wellbore.

Figure 3:
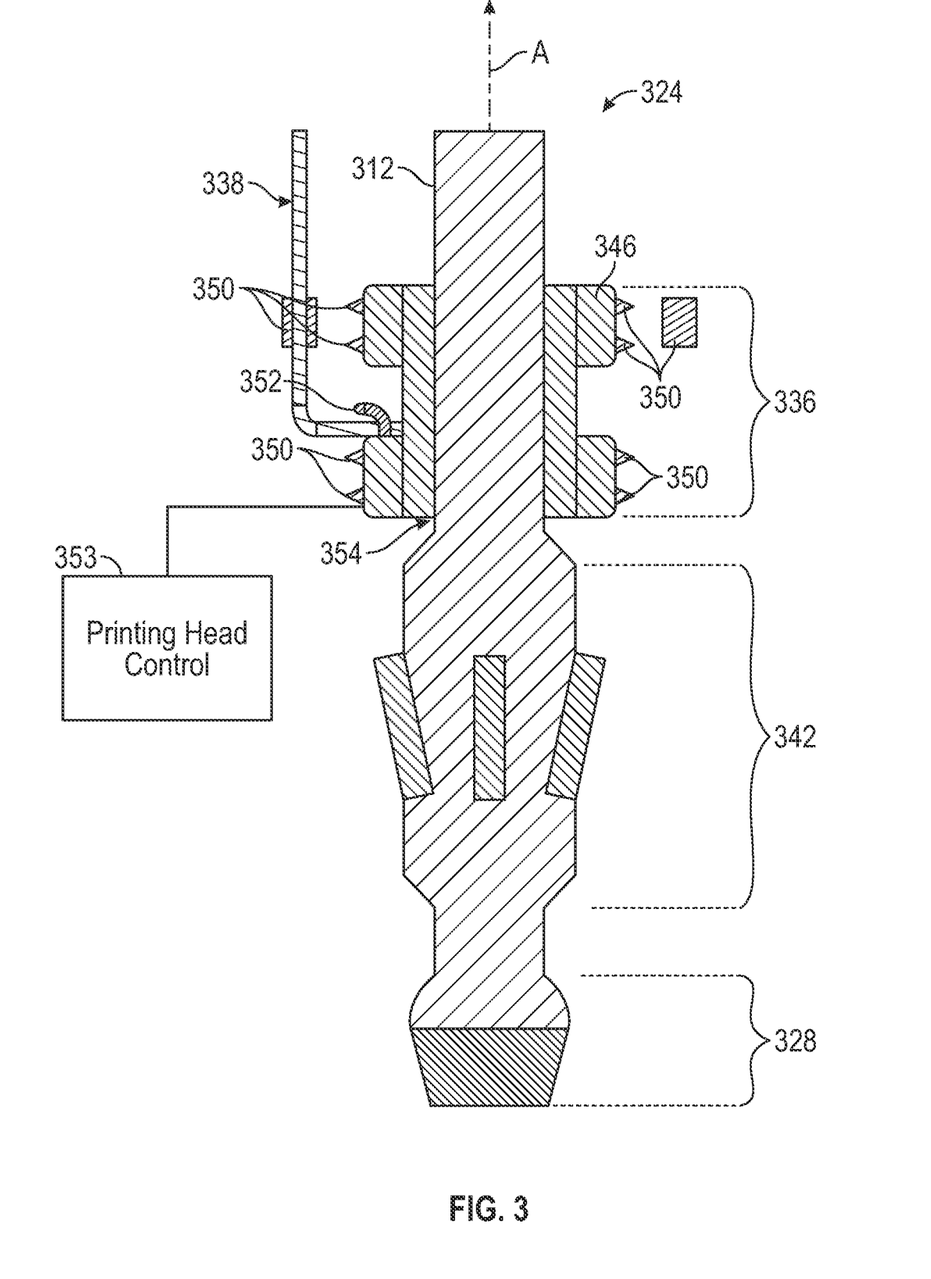
FIG. 3 schematically illustrates, in elevational view, a bottom hole assembly in accordance with one or more embodiments.

FIG. 3 schematically illustrates, in elevational view, a working example of a BHA 324 in accordance with one or more embodiments. As shown, BHA 324 includes an under-reamer 342 disposed axially upstring of and adjacent to the drill bit 328. A printer sub 336 is disposed axially above and upstring of the under-reamer 342 and is mounted above (or in an uphole direction from) a slip joint 354. Printer sub 336 includes a printer housing 346, expandable traction/sealing mechanisms 350, and a 3D printing head 352. Printer housing 346 may be generally toroidal in shape to surround the drill string 312. Printing head 352 may be embodied as a multi-axis printing head; one such head is shown, but two or more heads are envisioned.

In accordance with one or more embodiments, the printer housing 346 may be mounted on a non-rotating portion of drill string 312, or a portion of drill string that rotates at a different speed than the main sections of drill string 312. Such a portion of drill string 312 could be embodied by a non-rotating protector or stabilizer as generally known. Alternatively, such a portion of drill string 312 may include a sleeve or bearing as used in directional drilling, that either is non-rotating or does not rotate at the same speed as the main sections of drill string 312. The printer housing 346 may then be mounted with respect to the non-rotating (or differently rotating) portion in a manner to rotate independently of the main sections of drill string 312 and possibly even to move axially, within a limited range, with respect to the drill string 312.

In accordance with one or more embodiments, printing head 352 (or multiple printing heads) may be mounted on housing 346 in such a way as to orbit about a central longitudinal axis A of the drill string 312 at its own orbiting speed, thus independently of the rotation of drill string 312. In this connection, it may be mounted to orbit completely about the axis A or may be mounted to reciprocate back and forth along an orbiting path, which itself may be based on the positioning of feedlines 338 or any other intervening object disposed on printer housing 346. In an alternative embodiment, the printing head(s) 352 may orbit about axis A in a manner to match the rotational speed of drill string 312 itself, whether fixed or not with respect to the drill string.

In accordance with one or more embodiments, some traction/sealing mechanisms 350, schematically shown as triangular in shape in the figure, may be disposed on the printer housing 346. Additionally, one or more traction/sealing mechanisms 350 may be disposed adjacent to the printer housing 346. Each of the sealing/traction mechanisms 350 may be embodied as a retrievable packer and may expand to fluidly isolate one or more portions of the wellbore. As an alternative to retrievable packers, each of the sealing/traction mechanisms 350 may be embodied as a sealing element, a traction element, or both. The sealing/traction mechanisms 350 may also assist in mechanically stabilizing the printer housing 346 at a predetermined position within the wellbore.

In accordance with one or more embodiments, the printer sub 336 is not disposed below (or in a downhole direction from) slip joint 354. Additionally, if placed close to the slip joint 354, several advantages may result. For instance, there is a reduced likelihood of a loss of (drilling fluid) circulation, the drill string 312 sticking to the sides of the wellbore, and collapse of the wellbore. Further, the time required for drilling may be decreased, and the depth of drilling needed before printing the casing may also be reduced.

In accordance with one or more embodiments, the under-reamer 342 may be configured to expand and retract to customize the diameter of the wellbore. Also, one or more components of the printer sub 336 (such as printing head 352) may be configured to extend and retract in a radial direction to customize the diameter of the casing. Generally, feedlines 338 may provide to the printer housing 346 welding fluid and 3D printing material fed from the surface, such as from a materials unit such as that indicated at 240 in FIG. 2. The feedlines 338 may first be coupled to or connected to the printer sub 336 at the surface or once the printer sub 336 is downhole. Essentially, any suitable multi-axis printing head 352 may be employed. In accordance with an embodiment, especially for an application involving remedial work on an existing casing, 3D printing material and welding fluid can be held within a portion of the printer sub 336.

In accordance with one or more embodiments, multi-axis printing head 352 may have multiple degrees of freedom of movement, for example, rotational and linear along different axes, which provides for a wide range of possibilities for printing a casing. Such a casing may be printed for vertical, deviated, and horizontal wells alike, as well as for sidetracks including secondary wells or boreholes. A non-restrictive example of such a printing head is described and illustrated with respect to FIG. 8.

In accordance with one or more embodiments, a suitable printer control unit (or printing head control) 353 may be provided within the printer housing 346 for controlling the 3D printing head 352. Such a printer control unit 346 may be configured to guide the printing head 352 to print at least a portion of a casing at a location radially away from the central longitudinal axis A of the drill string 312. Alternatively, the suitable printer control unit 353 may be positioned at the surface and may communicate with the printing head 352 via one or more communication conduits (such as wires or fibers) running through the feedlines 338. One or more suitable motors may also be provided within printer housing 336 to drive movement of the printing head 352.

In this connection, in accordance with one or more embodiments, the printer control unit 353 may guide the print head 352 to undertake a pre-programmed protocol for printing a casing or a portion of a casing. Alternatively, a feedback mechanism may be provided to guide the print head 352 in response to one or more inputs, such as physical features or irregularities detected within the wellbore. Related detection systems could include, but need not be limited to, one or more mechanical sensors, such as a caliper or profilometer; one or more ultrasonic sensors; one or more photonic sensors, such as a laser, lidar, or structured light sensor; one or more 3D stereoscopic cameras; or one or more of capacitive, magnetic, or inductive sensors. Such detection systems may be mounted at print head 352 or elsewhere on printer housing 346.

In accordance with one or more embodiments, printer housing 346 may contain a heating unit to heat 3D printing material, such as metal filament, to combine with a welding fluid prior to being deposited to form a casing. In accordance with one or more embodiments, other types of 3D printing may be undertaken, such as via laser sintering or plasma printing. Generally, printer housing 346 may serve to protect printing head 352 from possible collisions with drill string 312, shield the printing head 352 from debris, house sensing equipment, and supply additional 3D printing material or welding fluids. Printer housing 346 may also include elements to help feed the 3D printing material from the feedlines 338. For instance, rotating elements within the printer housing 346 (such as one or more drivers or wire feeders) may be used to tense printing material in wire/filament form and to continue feeding it toward printing head 352 or associated heater unit. If there are multiple printing heads 352 and multiple wires fed through feedlines 338, a main wire feed could be used in combination with other individual feeders near each printing head 352.

Figure 4:
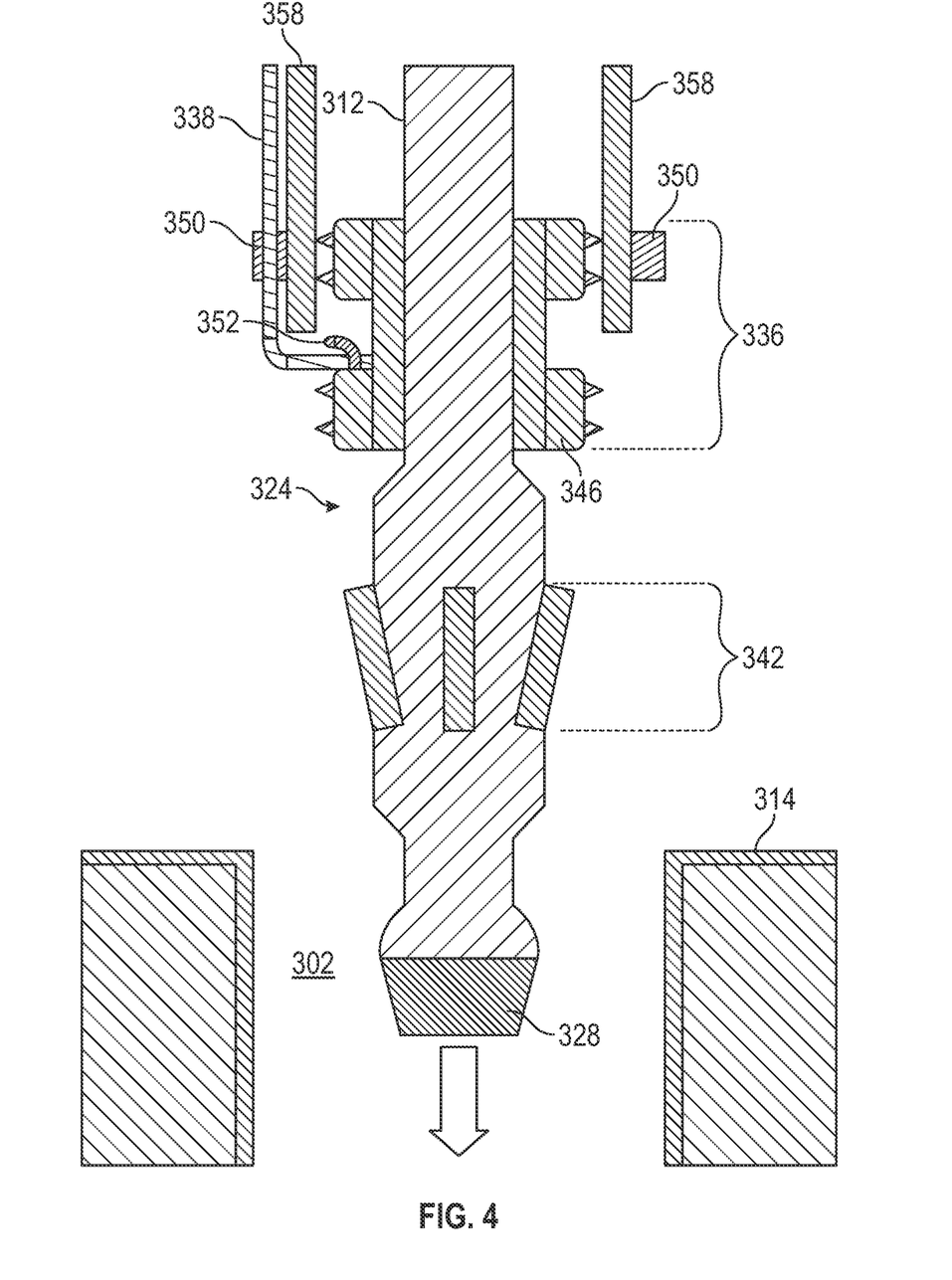
FIG. 4 schematically illustrates, in a cross-sectional and elevational view, the bottom hole assembly of FIG. 3 as it is inserted into a wellbore, in accordance with one or more embodiments.

FIG. 4 schematically illustrates, in a cross-sectional elevational view, the BHA 324 of FIG. 3 as it is introduced into a wellbore 302, in accordance with one or more embodiments. As shown, the BHA 324 (including the printer sub 336) is inserted into the opening of wellbore 302 at the surface 314 with a casing hanger 358. For its part, casing hanger 358 may be embodied as a larger cylindrical tube coaxial with the drill string 312. As shown, feedlines 338 may be attached to printer housing 346. The casing hanger 358 may be mounted to traverse downhole with the drill string 312 until the casing hanger 358 is set in place. As an alternative to the working example shown, the casing hanger 358 may already be set in place in the wellbore 302 before the drill string 312 and BHA 324 are introduced into the wellbore 302.

Figure 5:
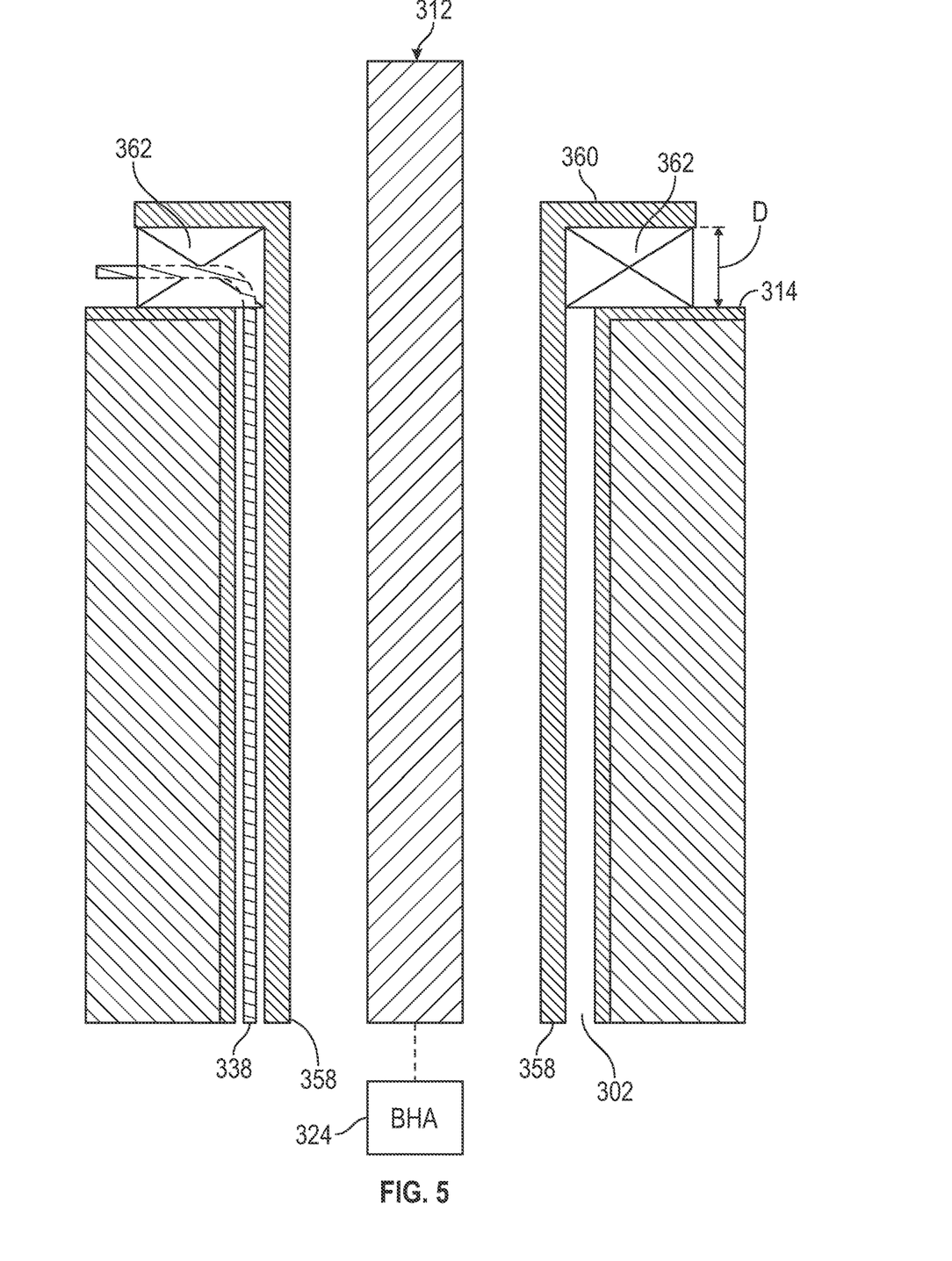
FIG. 5 schematically illustrates, in a cross-sectional and elevational view, an upper portion of the wellbore of FIG. 4 after insertion of the bottom hole assembly, in accordance with one or more embodiments.

FIG. 5 schematically illustrates, in a cross-sectional and elevational view, an upper portion of the wellbore 302 of FIG. 4 after insertion of the BHA 324, in accordance with one or more embodiments. At an upper end of the casing hanger 358 a terminal flange 360 generally in the shape of a ring or collar extends about the full circumference of the casing hanger 358. Terminal flange 360 may be supported by one or more supports 362 at a predetermined distance D above the surface 314 to leave an annular gap for the feedlines to be directed downhole behind the casing, that is, at an external side of the casing 358 radially away from drill string 312. By way of an illustrative examples, the supports 362 may be in the form of a casing head housing with one or more access ports for permitting feedlines 338 to be routed therethrough. As a casing is then printed in a downhole direction from the casing hanger 358, the feedlines 338 may remain behind the casing and away from the drill string 312. Such a configuration avoids any physical interference from the drill string 312 during drilling operations.

Figure 6:
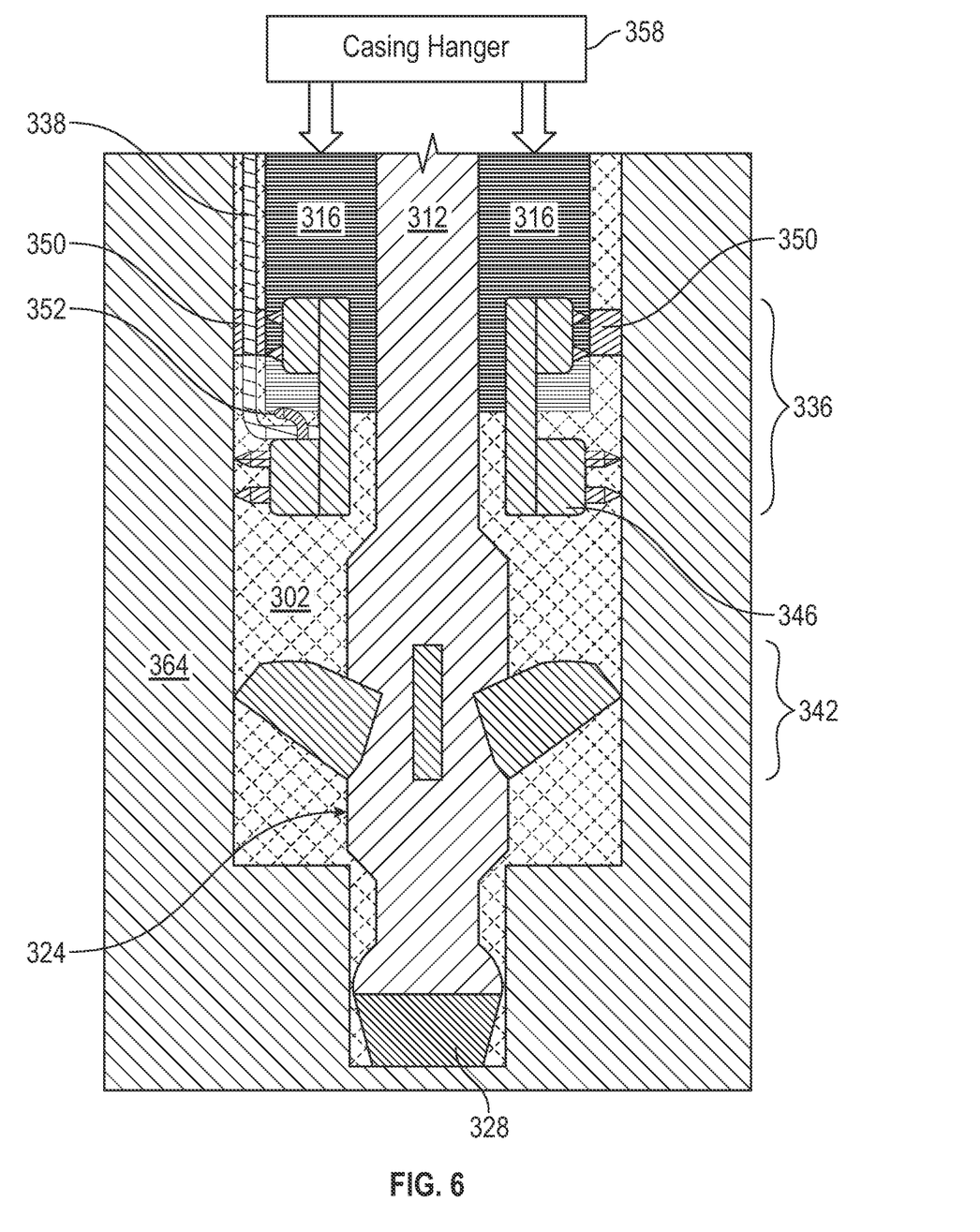
FIG. 6 schematically illustrates, in a cross-sectional and elevational view, the bottom hole assembly and printing sub-assembly of FIG. 3 undertaking a printing operation, in accordance with one or more embodiments.

FIG. 6 schematically illustrates, in a cross-sectional and elevational view, the BHA 324 and printer sub 336 of FIG. 3 undertaking a printing operation, in accordance with one or more embodiments. Here, the casing 316 is being printed in a downhole direction from the distal portion of casing hanger 358. Printing may take place while drilling operations are performed, such as while the drill bit 328 is forming new wellbore in a downhole direction in subsurface formation 364. The under-reamer 342 is widening the wellbore uphole from the drill bit.

In accordance with one or more embodiments, if the casing 316 is to be formed from metal, such as stainless steel, then one or more measures may be taken to ensure low concentrations of oxygen and water are present as the casing is printed downwardly from the casing hanger. For instance, to permit the printing task to be carried out toward such an end, a physical shell may be set in the region of the printer sub 336. Generally, traction/sealing mechanisms 350 can provide a seal to form such a physical shell. Also, if welding fluid is ejected from printing head 352 along with printing material, this can also help provide further shielding of the printing material from oxygen and water. As another alternative, or an infusion of additional fluids or gases may be introduced to assist in creating a free space where the printing task can be carried out.

Figure 7:
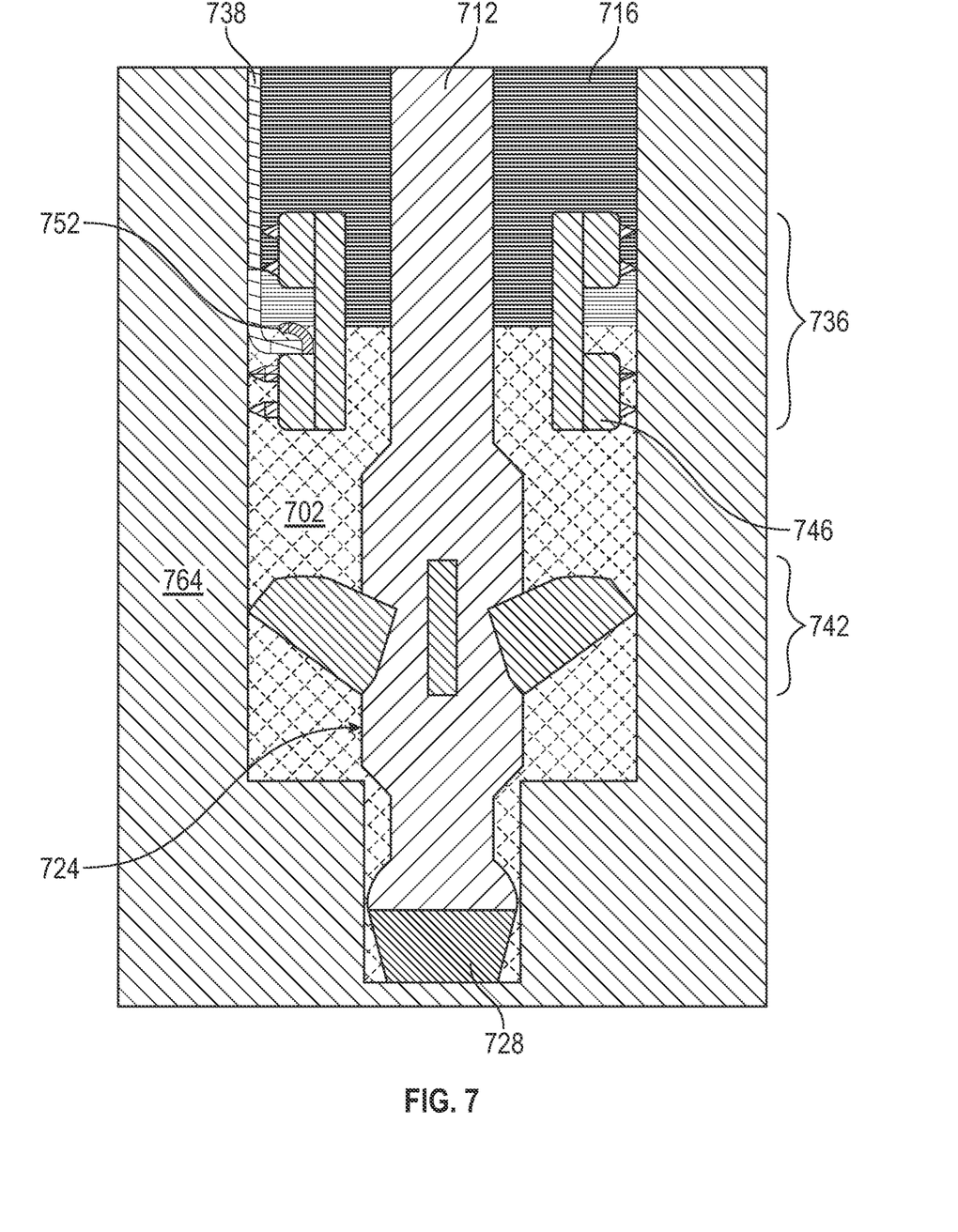
FIG. 7 schematically illustrates, in a cross-sectional and elevational view, a bottom hole assembly with a printing sub-assembly undertaking a variant printing operation, in accordance with one or more embodiments.

FIG. 7 schematically illustrates, in a cross-sectional and elevational view, a BHA 724 with a printer sub 736 undertaking a variant printing operation, in accordance with one or more embodiments. Also shown in FIG. 7 are feedlines 738 and under-reamer 742, analogous to like components discussed heretofore. In contrast to the embodiment of FIG. 6, the casing 716 is printed directly onto exposed rock of the subsurface formation 764, such as the interior surface or wellbore wall of the wellbore 702. Thus, this obviates any need for subsequent cementing operations. Such a variant could be pursued in drilling operations (via drill bit 728 and under-reamer 342) and remedial operations alike; it may also be especially beneficial in horizontal wells (or other settings) where cementing may be difficult.

As such, in accordance with one or more embodiments, a cleaning or treatment may first be applied to the exposed formation 764 to promote greater adherence of the printing material. By way of illustrative example, this could involve plasma or laser etching, cleaning, or any other suitable mechanical or chemical cleaning processes. Also, a base material, such as a binder, liner, or surface conditioning material, may be initially printed via printing head 752 or another printing head to promote adhesion, surface smoothness, or temperature regulation. Such a base material may also provide a measure of control over oxidation, impurities and uneven microstructures. For instance, as the exposed formation 764 might typically be defined by one or more highly porous rock materials, direct deposition of 3D printing material may at times result in uneven microstructures. Thus, if 3D printing material of smaller grain size is not used, the initial application of a base material to the exposed formation 764 may readily prevent the formation of uneven microstructures.

Figure 8:
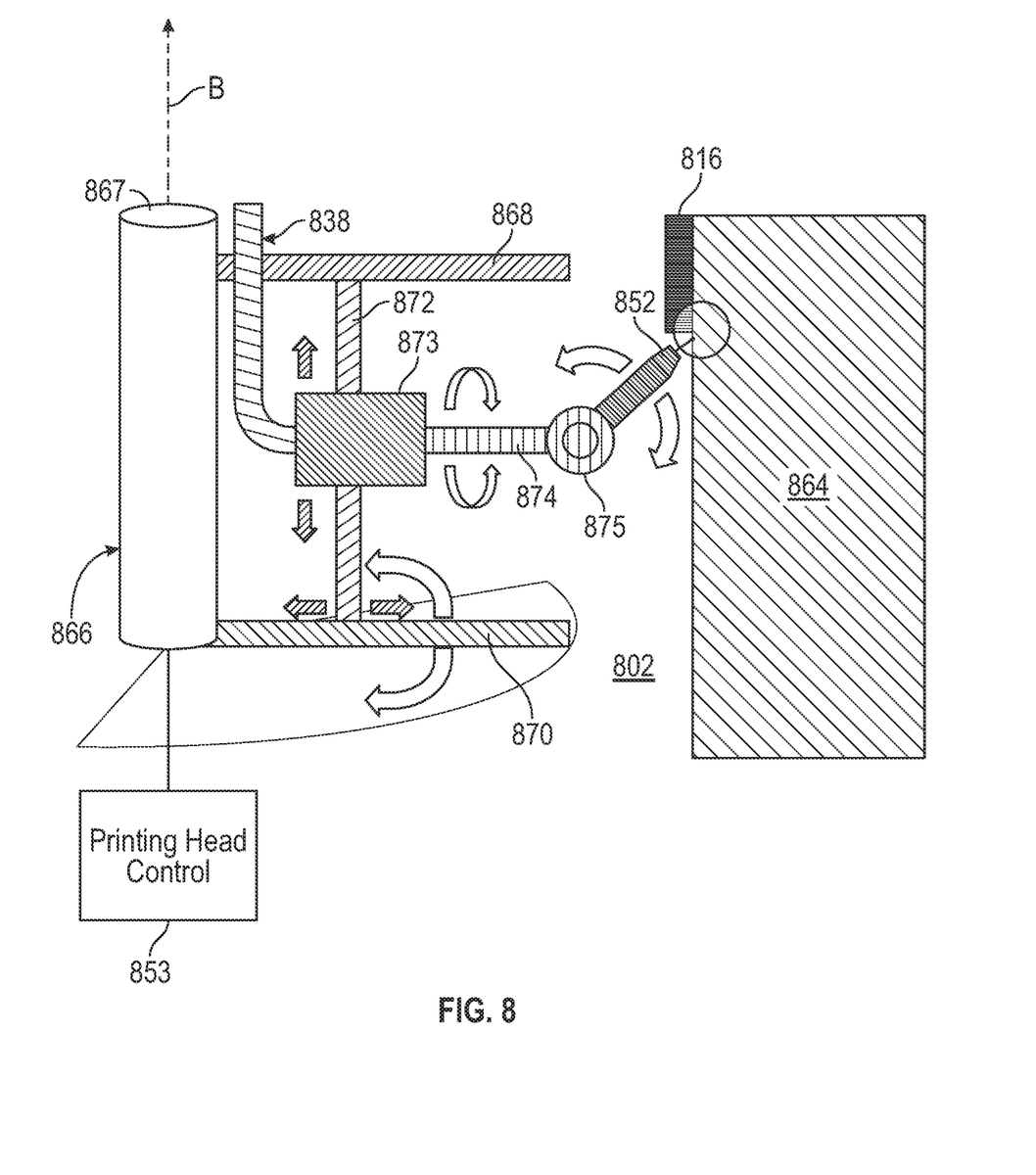
FIG. 8 schematically illustrates, in elevational view, details of a printing head unit in accordance with one or more embodiments.

FIG. 8 schematically illustrates, in elevational view, details of a printing head unit 866 in accordance with one or more embodiments. Printing head unit 866 may be utilized in accordance with any or all of the operating contexts shown in FIGS. 3-7, but particularly may be beneficial for the context of printing a casing 816 directly onto exposed rock 864 in a wellbore 802 as in the operating context of FIG. 7. For instance, such an arrangement could be particularly useful for long horizontal wells, where cementing might present logistical challenges.

As such, in accordance with one or more embodiments, printing head unit 866 may include a first support 867 that runs generally in parallel to a drill string, such as that indicated at 712 in FIG. 7. First support 867 may also be mounted for rotational movement about its own central longitudinal axis B at a printer housing, such as indicated at 746 in FIG. 7. Parallel second and third supports 868 and 870, respectively, may extend radially away from the first support 867 in an orientation generally perpendicular to axis B. A crosspiece 872 may extend between second and third supports 868 and 870 and may be slidably mounted for translational movement with respect to both supports 868/870 (and in a radial direction with respect to axis B). A unit 873 is slidably mounted on crosspiece 872 for translational movement with respect to the crosspiece 872 in a direction parallel to axis B. Unit 873 may receive one or more feedlines 838 that may transport 3D printing material and welding fluid. A shaft 874, rotatable about its own longitudinal axis, may extend away from unit 873 in a radial direction with respect to axis B. Printing head 852 may be pivotably mounted via pivot 875 with respect to shaft 874 and may also be in fluid communication with shaft 874, unit 873, and feedline(s) 838. Printing head control 853 may also be provided to guide the movement of printing head 852 via rotational movement of first support 867, sliding movement of crosspiece 872, axial movement of unit 873, rotational movement of shaft 874, and pivoting movement of printing head 852 itself to control the administration of 3D printing material and welding fluid through printing head 852. Printing head control 853 may be provided within a printer housing or may be positioned at the surface, and may otherwise function analogously to the printing head control 353 discussed herein in connection with FIG. 3.

In accordance with one or more embodiments, unit 873 may include one or more of a motor, a welding fluids, a wire feeder system, and a power conversion unit. Additionally or alternatively, unit 873 may contain the printing head control 853 described previously.

From the foregoing, it may be appreciated that embodiments as broadly contemplated may avail tremendous flexibility in generating one or more cross-sectional shapes for a casing structure. As such, FIGS. 9A-9D schematically illustrate, in cross-sectional plan view, different printed casing structures in accordance with one or more embodiments. In these figures, similar or analogous components are indicated with similar reference numerals and a corresponding suffix of a, b, c or d, respectively.

Figure 9A:
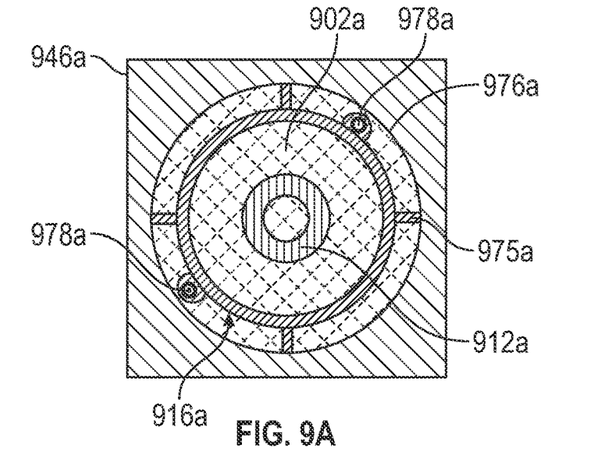
FIGS. 9A-9D schematically illustrate, in a cross-sectional plan view, different printed casing structures in accordance with one or more embodiments.

In accordance with one or more embodiments, FIG. 9A shows a printed casing 916a that may result from a process of printing in a downhole direction from a casing hanger, as described and illustrated with respect to FIGS. 4-6. As shown, in a wellbore 902a drilled into a subsurface formation 964a via drill string 912a, printed casing 916a may include one or more spacer portions 975a to separate the cylindrical main body of casing 916a from the interior wall 976a of wellbore 902a. Here, four such spacer portions 975a are shown, evenly distributed about a circumference of casing 916a. Additionally, one or more channels 978a may be printed to guide feedlines along the exterior of the cylindrical main body of casing 916a. In FIG. 9A, two such channels are shown that are diametrically opposed from one another. This permits a cementing operation while preventing the feedlines from being fixed in the cement, and also ensures that the feedlines will then be generally accessible and retrievable. Other advantages of the channels 978a include the possibility of downhole energy transmission, signal transmission, capability for holding and conveying chemical injection tubes, or for holding one or more sensors. In accordance with an alternate embodiment, one or more channels 978 may be printed along the interior of the cylindrical main body of casing 916a.

Figure 9B:
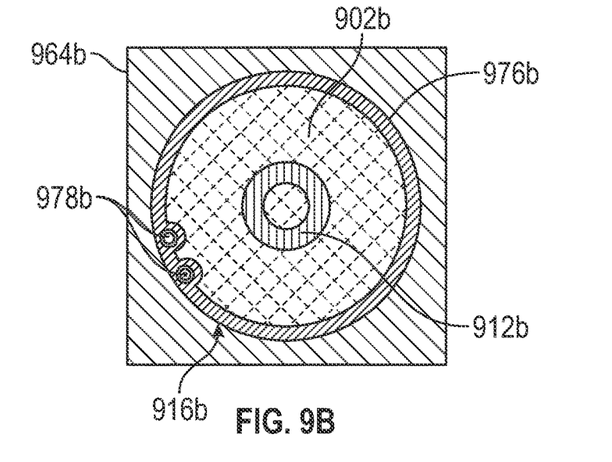

In accordance with one or more embodiments, FIG. 9B shows a printed casing 916b which may result from a process of printing directly onto exposed rock of subsurface formation 964b, as described and illustrated with respect to FIG. 7. As shown, in a cylindrical wellbore 902b (with interior wall 976b) drilled into a subsurface formation 964b via drill string 912b, printed casing 916b may include channels 978b for guiding feedlines along the interior of cylindrical main body of casing 916b. In FIG. 9B, two such channels are shown adjacent to one another.

Figure 9C:
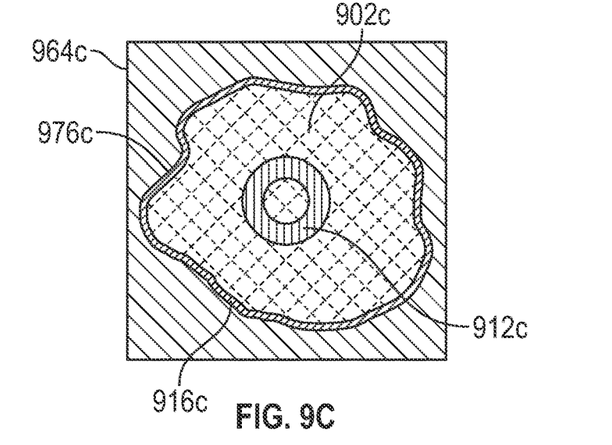
Figure 9D:
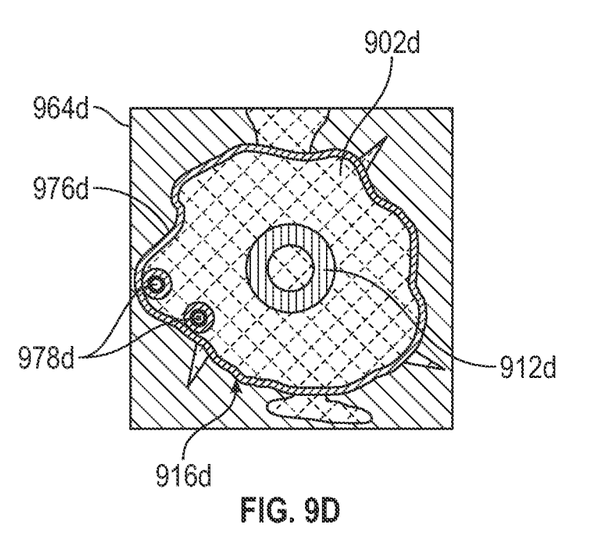

In accordance with one or more embodiments, FIGS. 9C and 9D illustrate possibilities for printing casings with non-cylindrical, irregular geometries, particularly when printed directly onto exposed rock of a subsurface formation 964c and 964d, respectively. FIG. 9C depicts a casing 916c configured to match the interior wall 976c of wellbore 902c. In one or more embodiments, the casing may be customized or predetermined based upon an irregular shape.

On the other hand, in accordance with one or more embodiments, FIG. 9D depicts a casing 916d with an irregular shape generated ad hoc in response to irregularities viewed, encountered, detected, determined, or measured in the wellbore 902d, for example, fractures or other tangible discontinuities in the surrounding formation 964d or encountered via uneven drilling. Such a feedback function may be performed by a printing head control 353 as discussed above with respect to FIG. 3. Thus, a geometry of the wellbore 902d is determined during drilling, and the casing 916d is printed with a cross-sectional shape adapted to the determined geometry of the wellbore 902d. As also shown, channels 978d may also be printed for guiding feedlines along the interior of the casing 916d. In FIG. 9D, two such channels are shown adjacent to one another.

Figure 10A:
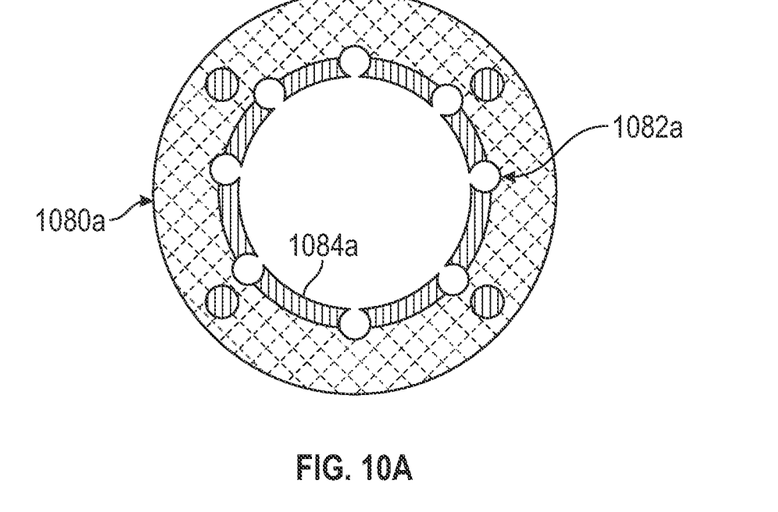
FIG. 10A schematically illustrates, in plan view, an API bowl structure in accordance with one or more embodiments.
Figure 10B:
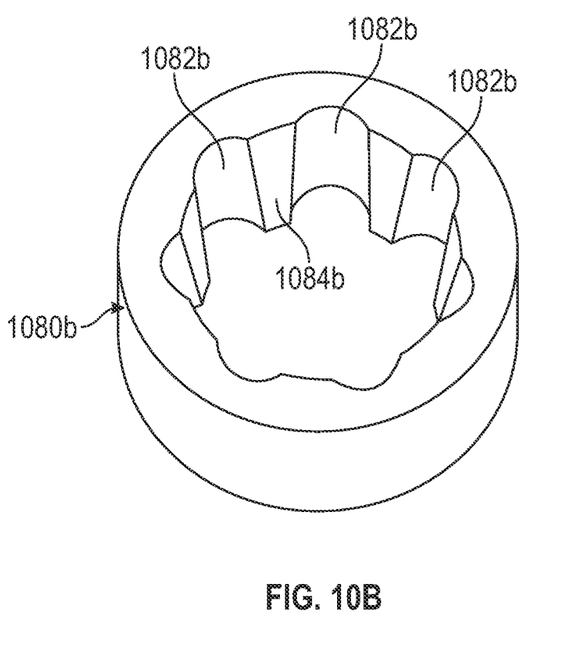
FIG. 10B illustrates, in an isometric plan view, a second embodiment of an API bowl structure in accordance with one or more embodiments.

FIG. 10A schematically illustrates, in plan view, a first embodiment of an API (American Petroleum Institute) bowl structure in accordance with one or more embodiments. Additionally, FIG. 10B illustrates, in an isometric plan view, a second embodiment of an API bowl structure in accordance with one or more embodiments. Continued reference may be made to both of FIGS. 10A and 10B jointly. Generally, the structures shown in FIGS. 10A-10B may lend themselves to a process of 3D printing a casing in a downhole direction from a casing hanger, as illustrated and described (by way of example) with respect to FIGS. 4-6.

As shown in FIG. 10A, in accordance with one or more embodiments, API bowl 1080a may be used in a rotary table (on a rig floor such as indicated at 132 in FIG. 1) to take the place of a conventional API bowl. Accordingly, a number of grooves 1082a are defined by the configuration of API bowl 1080a. Such grooves 1082a may be recessed into an inner edge 1084a of the bowl 1080a as shown at an inner circumference of the bowl 1080a to guide feedlines downhole. Such grooves 1082a may accommodate a number of feedlines, cables, or other accessories without unduly affecting operation of a drill string routed through the rotary table. Thus, by way of example, the grooves 1082 may avert any damage to the feedlines that may result from making and breaking drill pipe connections. Eight such grooves 1082a are shown in FIG. 10A evenly distributed about the inner circumference of bowl 1080a, though it is appreciated that any suitable number may be used. Also, the grooves 1082a are recessed in a manner that each may describe a circular arc of between about 300 and about 320 degrees.

In accordance with one or more embodiments, the API bowl 1080b shown in FIG. 10B functions and is generally structured similarly. As shown, bowl 1080b may similarly include grooves 1082b recessed into an inner edge 1084b. In the embodiment of FIG. 10B, seven grooves 1082b are defined. Also, the grooves 1082b may each be recessed in a manner to describe a shallower circular arc than the grooves 1082a in FIG. 10A. For instance, the grooves 1082b may each describe a circular arc of between about 40 and about 60 degrees.

Figure 11:
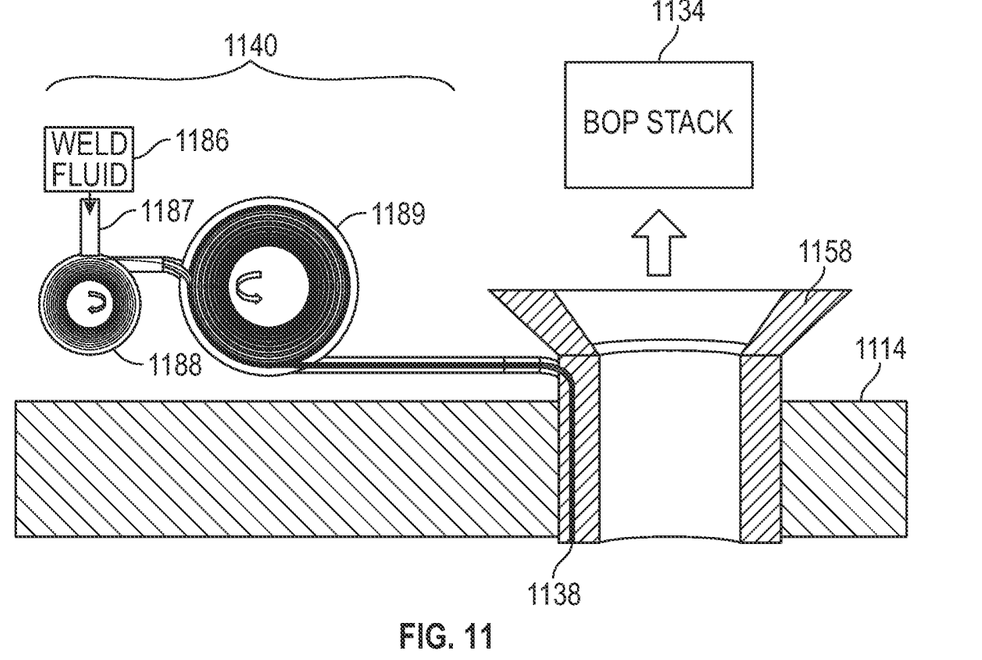
FIG. 11 schematically illustrates, in elevational view, components for the near-surface supply of welding fluids and printing materials in accordance with one or more embodiments.

FIG. 11 schematically illustrates, in elevational view, components for the near-surface supply of welding fluids and printing materials in accordance with one or more embodiments. As shown, a BOP stack 1134 may be disposed at surface 1114. A casing hanger is indicated at 1158 from which a casing may be 3D printed in a downhole direction as described and illustrated with respect to FIGS. 4-6. Indicated generally at 1140 is a materials unit, including components for supplying materials downhole through one or more feedlines 1138 for use by a downhole printing sub, such as the one indicated at 336 in FIGS. 4-6. A supply of welding fluid 1186 suitable for 3D printing may be introduced via a check valve 1187 to combine with a store (such as a spool) of printing material 1188 in filament form. Indicated at 1189 is a spool of sheathing or piping material for forming the one or more feedlines 1138 that are introduced downhole and through which the printing material 1188 and welding fluid 1186 are directed. In accordance with an alternate embodiment, printing material 1188 and welding fluid 1186 may be fed downhole through separate feedlines.

In accordance with one or more embodiments, the feedlines 1138 are directed downhole from the surface through a channel (or piping hole) in the wall of the casing hanger 1158 as shown. In accordance with an alternate embodiment, the feedlines 1138 may be fed through the BOP stack 1134 and into a channel (or piping hole) in the casing hanger 1158. Other possible solutions for feeding feedlines downhole include using a drilling motor (or mud motor) to feed the feedlines 1138 directly to a wellbore portion further downhole or through a stationary string.

Generally, in accordance with embodiments described and illustrated, a wide range of printing tasks may be undertaken. For instance, limited "spot" repairs may be undertaken, such as the repair or reprinting of one or more damaged portions of a casing. By way of another example, a corroded or worn-out portion of a casing may be restored to an original thickness. In these instances, a printing head control such as that indicated at 353 or 853 in FIGS. 3 and 8 may direct a printing head to execute a defined printing task, such as to print over a defined surface area and to a defined (constant or varying) thickness. One or more feedback mechanisms as previously described with relation to FIG. 3 may also be used in such a connection, especially to detect a portion of a casing where repairs may need to be made.

Further, in accordance with one or more embodiments, a 3D-printed casing may be formed from different materials, either as a multi-layered composite or via different materials used at different axial sections of a wellbore. The same printing head, or multiple printing heads, may be used toward such ends.

Additionally, in accordance with one or more embodiments, a casing hanger may be printed, and the casing itself may then be printed in a downhole direction from the distal end of the hanger. In another embodiment, one or more support structures for a casing may be printed directly onto the rock formation in a wellbore with the casing itself then printed onto those supports.

Figure 12:
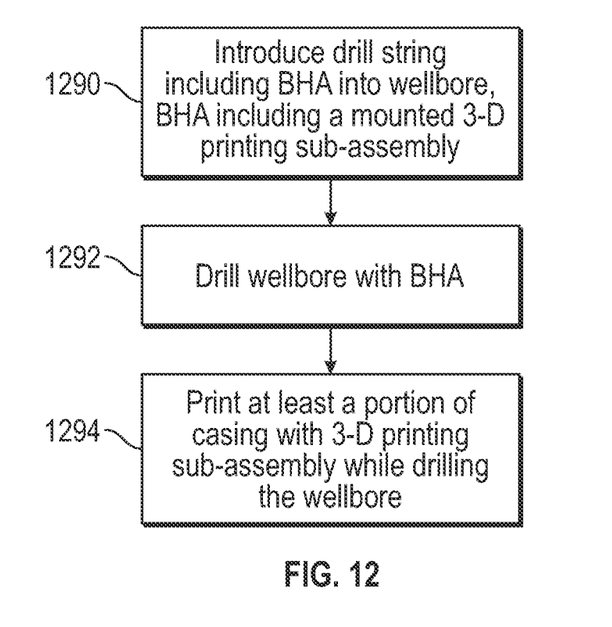
FIG. 12 illustrates a flowchart of a method in accordance with one or more embodiments.

FIG. 12 shows a flowchart of a method as a general overview of steps that may be carried out in accordance with one or more embodiments described or contemplated.

In accordance with one or more embodiments, a drill string including a BHA is introduced into a wellbore, wherein the BHA includes a mounted 3D printing sub-assembly (1290). An example may correspond to the drill string 312 or 712, and the BHA 324 or 724, shown in FIG. 6 or 7, respectively. Additionally, the 3D printing sub-assembly may correspond to the sub-assembly 336 or 736, shown in FIG. 6 or 7, respectively.

In accordance with one or more embodiments, a wellbore is drilled with the BHA (1292). Additionally, at least a portion of a casing is printed with the 3D printing sub-assembly while drilling the wellbore (1294). Illustrative and non-restrictive examples of such drilling and printing can be appreciated from FIGS. 6 and 7 and their related description herein.

Although only a few example embodiments have been previously described in detail, those skilled in the art will readily appreciate that many modifications are possible in the example embodiments without materially departing from the disclosed scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:
   introducing a drill string including a bottom hole assembly into a wellbore, wherein the bottom hole assembly includes a mounted 3D printing sub-assembly;
   drilling a wellbore with the bottom hole assembly; and
   printing at least a portion of a casing with the 3D printing sub-assembly while drilling the wellbore.

2. The method according to claim 1, wherein the printing comprises printing a casing with the 3D printing sub-assembly.

3. The method according to claim 2, further comprising:
   disposing a casing hanger in the wellbore,
   wherein printing the casing comprises initiating printing at the casing hanger and continuing the printing in a direction away from the casing hanger.

4. The method according to claim 3, further comprising mounting the casing hanger on the drill string prior to disposing the casing hanger in the wellbore.

5. The method according to claim 2, wherein printing the casing comprises:
   printing a main body of the casing; and
   printing one or more spacer portions to separate the main body of the casing from an interior wall of the wellbore.

6. The method according to claim 5, wherein printing the casing comprises printing one or more channels along an exterior of the main body of the casing.

7. The method according to claim 2, wherein printing the casing comprises printing onto an interior wall of the wellbore.

8. The method according to claim 7, wherein printing onto an interior wall of the wellbore comprises:
   printing a base material onto the interior wall of the wellbore; and
   thereafter printing the casing onto the base material.

9. The method according to claim 7, wherein printing the casing comprises printing a casing with a predetermined cross-sectional shape.

10. The method according to claim 7, further comprising:
    determining a geometry of the wellbore during drilling,
    wherein printing the casing comprises printing a casing with a cross-sectional shape adapted to the determined geometry of the wellbore.

11. The method according to claim 7, wherein printing the casing comprises printing one or more channels along an interior of the casing.

12. The method according to claim 1, wherein the bottom hole assembly includes a drill bit and an under-reamer.

13. The method according to claim 1, wherein the printing sub-assembly includes a 3D printing head.

\* \* \* \* \*